(12) United States Patent
Burger et al.

(10) Patent No.: US 10,843,634 B2
(45) Date of Patent: Nov. 24, 2020

(54) OPERATOR CONSOLE

(71) Applicant: Caterpillar Paving Products Inc., Brooklyn Park, MN (US)

(72) Inventors: Tyler Burger, Plymouth, MN (US); Johnson David Sugidharan, Chennai (IN); Michael S. Hemry, Maple Grove, MN (US); Brian D. Nagel, Ramsey, MN (US); Cody Conrad Lynne, Minneapolis, MN (US); Mike P. Siers, Brooklyn Center, MN (US); Jaya Kumar Karani, Minneapolis, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 64 days.

(21) Appl. No.: 16/362,855

(22) Filed: Mar. 25, 2019

(65) Prior Publication Data
US 2020/0307462 A1 Oct. 1, 2020

(51) Int. Cl.
*B60R 7/06* (2006.01)
*B62D 1/04* (2006.01)

(52) U.S. Cl.
CPC . *B60R 7/06* (2013.01); *B62D 1/04* (2013.01)

(58) Field of Classification Search
CPC .................................. B60R 7/06; B62D 1/04
See application file for complete search history.

(56) References Cited

U.S. PATENT DOCUMENTS

| | | | | |
|---|---|---|---|---|
| 3,910,371 A | * | 10/1975 | Magrini | B60K 37/00 180/90 |
| 3,992,070 A | * | 11/1976 | Dunn | B60K 37/00 49/345 |
| 4,112,718 A | | 9/1978 | Logsdon et al. | |
| 4,953,771 A | * | 9/1990 | Fischer | B60N 3/102 108/44 |
| 5,749,554 A | * | 5/1998 | Avila | B60N 3/102 224/281 |
| 6,164,685 A | | 12/2000 | Fischer et al. | |
| 6,312,035 B1 | | 11/2001 | Aoki et al. | |
| 6,581,709 B2 | | 6/2003 | Tsuji | |
| 6,616,165 B2 | | 9/2003 | Tsuji | |

(Continued)

FOREIGN PATENT DOCUMENTS

DE 4122540 1/1992
DE 102016007348 12/2017
(Continued)

*Primary Examiner* — Darlene P Condra

(57) ABSTRACT

A cover for an operator console of a machine includes a first section rotatably coupled to the operator console. The first section selectively rotates between a first position and a second position about a rotational axis. The cover also includes a second section rotatably coupled to the operator console and the first section. The second section selectively rotates between a third position and a fourth position about the rotational axis. The second section is also adapted to engage with the first section during rotation of the second section from the third position to the fourth position to rotate the first section from the first position to the second position. The second section is further adapted to engage with the first section during rotation of the second section from the fourth position to the third position to rotate the first section from the second position to the first position.

20 Claims, 6 Drawing Sheets

(56) References Cited

U.S. PATENT DOCUMENTS

| | | | |
|---|---|---|---|
| 6,648,194 B2* | 11/2003 | Schaal | B60N 3/102 |
| | | | 224/483 |
| 7,757,806 B2 | 7/2010 | Bower | |
| 8,074,832 B2 | 12/2011 | Fujiwara et al. | |
| 8,157,314 B2* | 4/2012 | Gwon | B60R 7/02 |
| | | | 296/37.7 |
| 8,505,996 B1 | 8/2013 | Shin | |
| 8,910,990 B1 | 12/2014 | Oldani et al. | |
| 9,815,412 B1* | 11/2017 | Tsumiyama | B60R 7/06 |
| 9,960,800 B2 | 5/2018 | An et al. | |
| 2007/0180657 A1* | 8/2007 | Zeilbeck | E05D 3/022 |
| | | | 16/354 |
| 2016/0266610 A1 | 9/2016 | Nessel | |
| 2016/0272122 A1* | 9/2016 | Dunham | B60R 7/06 |
| 2020/0173217 A1* | 6/2020 | Hodgson | E05F 1/16 |
| 2020/0189477 A1* | 6/2020 | Kim | B60R 7/06 |

FOREIGN PATENT DOCUMENTS

| | | |
|---|---|---|
| EP | 1120308 | 8/2001 |
| EP | 1308348 | 5/2003 |
| EP | 2288515 | 3/2016 |
| FR | 2892676 | 5/2007 |
| JP | 2001262626 | 9/2001 |
| JP | 2017202748 | 11/2017 |
| WO | 2016056792 | 4/2016 |
| WO | 2017220849 | 12/2017 |

* cited by examiner

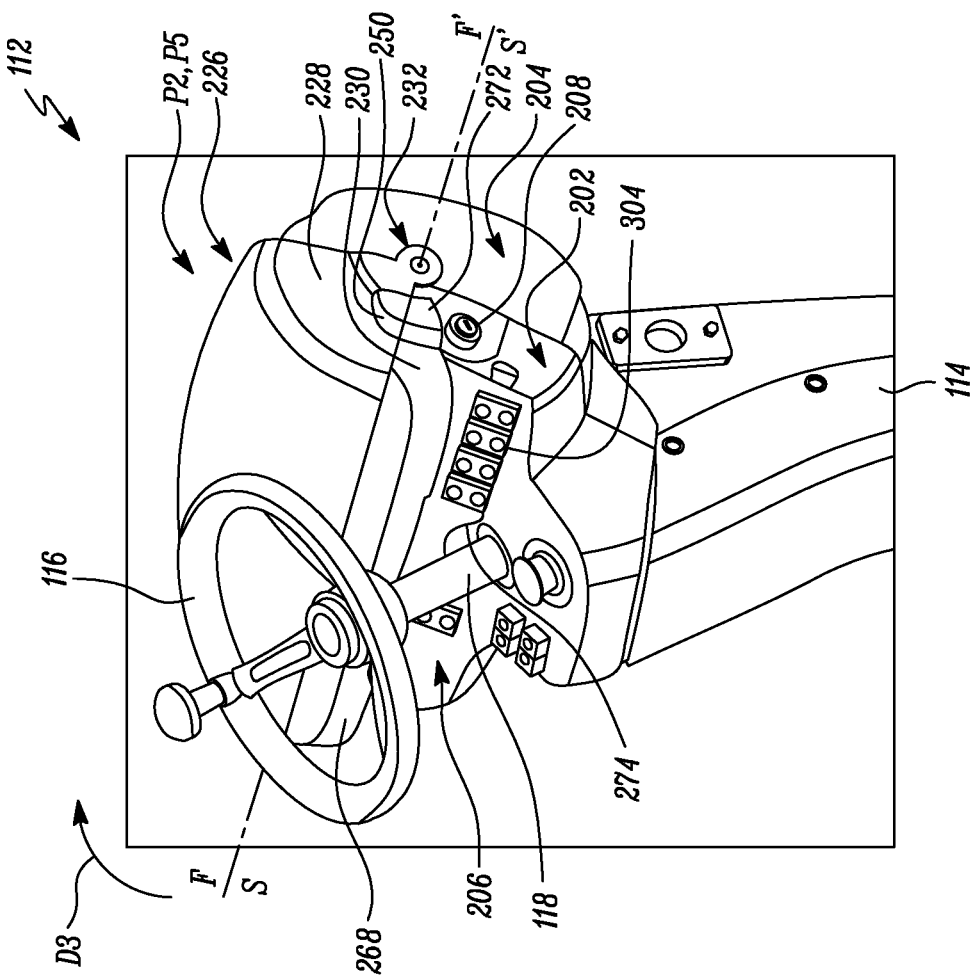
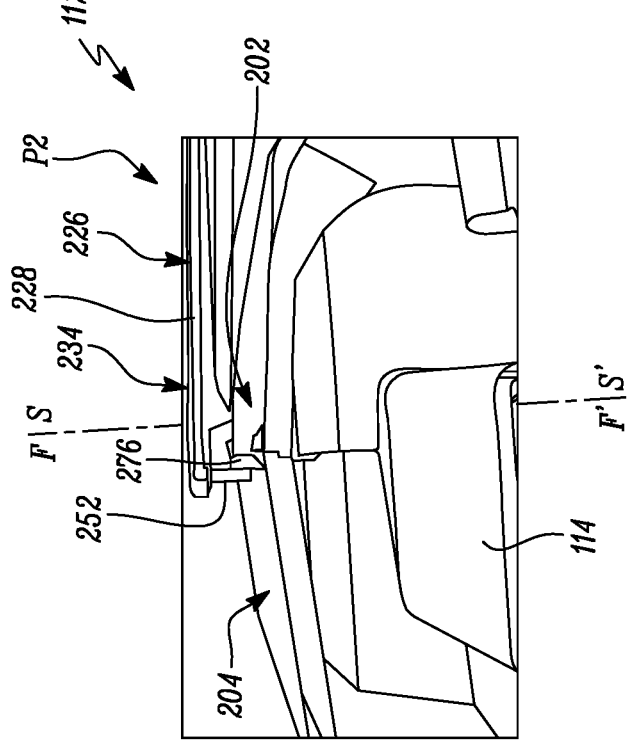
FIG. 3F
FIG. 3E

OPERATOR CONSOLE

TECHNICAL FIELD

The present disclosure relates to an operator console. More particularly, the present disclosure relates to the operator console for a machine.

BACKGROUND

A machine, such as a compaction machine, includes an operator station to provide an operating space for an operator on the machine. The operator station includes an operator console for the operator to control the machine and perform desired operations on ground. In many situations, the operator console may include a cover in order to enclose the operator console and provide protection to the operator console from environmental factors, physical impact, and so on. However, the cover may have a complicated design and/or may have a complicated operating process requiring tools or multiple steps to open and/or close the cover.

Additionally, due to a limited space on the operator station, it may be difficult to store utilities, such as an operator manual, a tool-kit, and the like, on the operator station. In some situations, a storage compartment may be provided on the operator station. However, the storage compartment may be provided away from the operator console and may require the operator to move away from the operator console in order to access the storage compartment. Hence, there is a need for an improved operator console for such machines.

U.S. Pat. No. 6,581,709 describes an improved type of storage compartment and display location for a small vehicle such as a motor scooter. The handlebar cover is formed with a recess which forms at the front thereof a storage compartment where small articles can be stored and at the rear thereof an area where the display can be mounted. This arrangement permits mounting of the display from above and places it closer to the rider so that it can be more easily viewed.

SUMMARY OF THE DISCLOSURE

In an aspect of the present disclosure, a cover for an operator console of a machine is provided. The operator console includes an operator interface and a storage compartment disposed adjacent to the operator interface. The cover includes a first section rotatably coupled to the operator console. The first section is adapted to selectively rotate between a first position and a second position about a rotational axis. The first section is adapted to provide access to each of the storage compartment and the operator interface in the first position and at least partially enclose each of the storage compartment and the operator interface in the second position. The cover also includes a second section rotatably coupled to the operator console and the first section. The second section is adapted to selectively rotate between a third position and a fourth position about the rotational axis. The second section is adapted to provide access to each of the storage compartment and the operator interface in the third position and enclose the operator interface in the fourth position in association with the first section disposed in the second position. The second section is also adapted to engage with the first section during rotation of the second section from the third position to the fourth position to rotate the first section from the first position to the second position. The second section is further adapted to engage with the first section during rotation of the second section from the fourth position to the third position to rotate the first section from the second position to the first position.

In another aspect of the present disclosure, an operator console for a machine is provided. The operator console includes an operator interface. The operator console also includes a storage compartment disposed adjacent to the operator interface. The operator console further includes a cover provided in association with each of the operator interface and the storage compartment. The cover includes a first section rotatably coupled to the operator console. The first section is adapted to selectively rotate between a first position and a second position about a rotational axis. The first section is adapted to provide access to each of the storage compartment and the operator interface in the first position and at least partially enclose each of the storage compartment and the operator interface in the second position. The cover also includes a second section rotatably coupled to the operator console and the first section. The second section is adapted to selectively rotate between a third position and a fourth position about the rotational axis. The second section is adapted to provide access to each of the storage compartment and the operator interface in the third position and enclose the operator interface in the fourth position in association with the first section disposed in the second position. The second section is also adapted to engage with the first section during rotation of the second section from the third position to the fourth position to rotate the first section from the first position to the second position. The second section is further adapted to engage with the first section during rotation of the second section from the fourth position to the third position to rotate the first section from the second position to the first position.

In yet another aspect of the present disclosure, a machine is provided. The machine includes a frame. The machine includes a power source provided on the frame. The machine also includes a plurality of ground engaging members rotatably coupled to the frame. The machine further includes an operator console provided on the frame. The operator console includes an operator interface. The operator console also includes a storage compartment disposed adjacent to the operator interface. The operator console further includes a cover provided in association with each of the operator interface and the storage compartment. The cover includes a first section rotatably coupled to the operator console. The first section is adapted to selectively rotate between a first position and a second position about a rotational axis. The first section is adapted to provide access to each of the storage compartment and the operator interface in the first position and at least partially enclose each of the storage compartment and the operator interface in the second position. The cover also includes a second section rotatably coupled to the operator console and the first section. The second section is adapted to selectively rotate between a third position and a fourth position about the rotational axis. The second section is adapted to provide access to each of the storage compartment and the operator interface in the third position and enclose the operator interface in the fourth position in association with the first section disposed in the second position. The second section is also adapted to engage with the first section during rotation of the second section from the third position to the fourth position to rotate the first section from the first position to the second position. The second section is further adapted to engage with the first section during rotation of the second section from the fourth position to the third position to rotate the first section from the second position to the first position.

Other features and aspects of this disclosure will be apparent from the following description and the accompanying drawings.

BRIEF DESCRIPTION OF THE DRAWINGS

FIGS. 3A to 3F are different perspective views of the operator console of FIG. 2 in an assembled position, according to one embodiment of the present disclosure.

DETAILED DESCRIPTION

Figure 1:
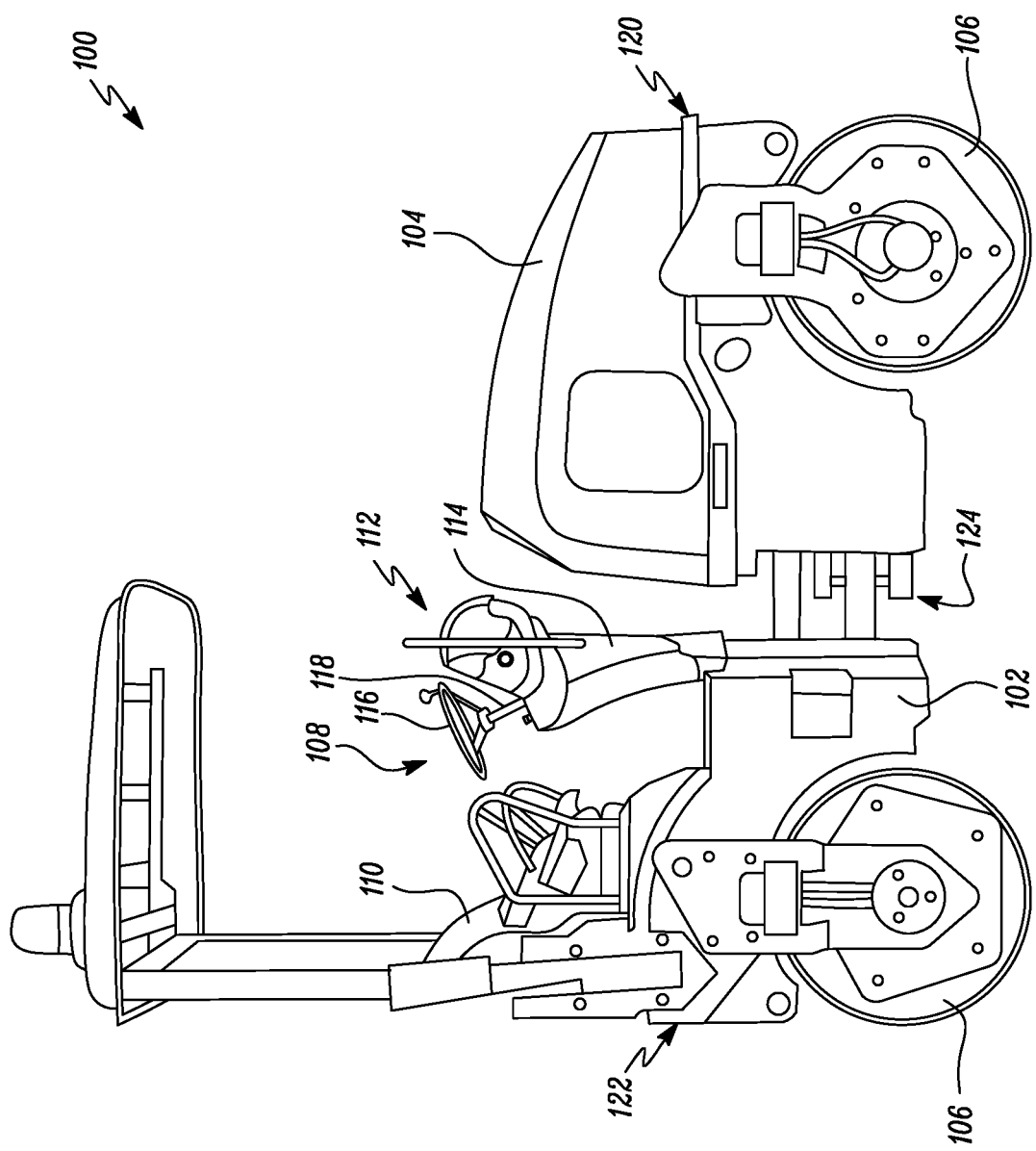
FIG. 1 is a side view of an exemplary machine, according to one embodiment of the present disclosure.

Wherever possible, the same reference numbers will be used throughout the drawings to refer to the same or like parts. Referring to FIG. 1, an exemplary machine 100 is illustrated. In the illustrated embodiment, the machine 100 is a compaction machine. In other embodiments, the machine 100 may be any other machine, such as a loader, a tractor, a skid steer, a fork lift, a crane, a paver, and so on. The machine 100 may be any machine associated with an industry, such as construction, mining, transportation, agriculture, material handling, marine, waste management, and so on.

The machine 100 includes a frame 102. In the illustrated embodiment, the frame 102 includes a front portion 120 and a rear portion 122. The rear portion 122 is movably coupled to the front portion 120 via an articulation joint 124. In other embodiments, the frame 102 may include a singular, non-articulating configuration, such that the articulating joint 124 may be omitted. The frame 102 supports one or more components of the machine 100. The machine 100 includes an enclosure 104 provided on the frame 102. The enclosure 104 encloses a power source (not shown) mounted on the frame 102. The power source may be any power source, such as an internal combustion engine, batteries, motor, and so on, or a combination thereof. The power source may provide power to the machine 100 for mobility and operational requirements.

The machine 100 also includes a number of ground engaging members 106 rotatably mounted to the frame 102. In the illustrated embodiment, each of the ground engaging members 106 are rollers. In other embodiments, one or more of the ground engaging members 106 may be wheels or tracks. The ground engaging members 106 support and provide mobility to the machine 100 on ground. The ground engaging members 106 also perform compaction of a surface, such as an asphalt surface, based on application requirements.

The machine 100 further includes an operator station 108 mounted on the frame 102. The operator station 108 includes a seat 110 and an operator console 112. The seat 110 is adapted to provide a seating surface for an operator (not shown). The operator console 112 is adapted to house one or more controls and/or visual indicators, such as a display unit, a touchscreen unit, and so on, of the machine 100. In the illustrated embodiment, the operator console 112 is mounted on the frame 102 within the operator station 108 via a mounting unit 114. In other embodiments, the operator console 112 may be mounted on a dashboard (not shown) of the machine 100.

Figure 2:
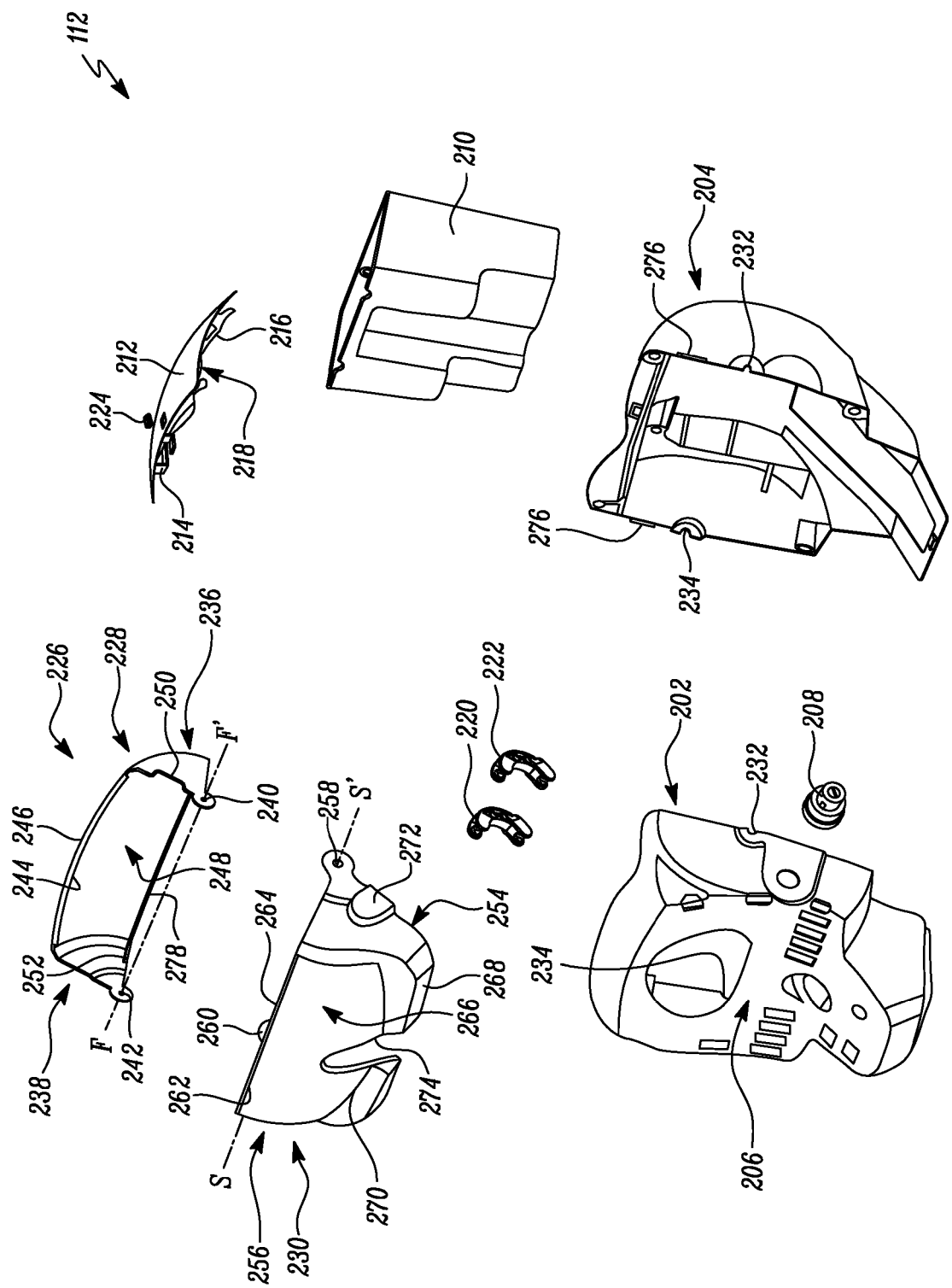
FIG. 2 is a perspective exploded view of an operator console of the machine of FIG. 1, according to one embodiment of the present disclosure.

Referring to FIG. 2, an exploded perspective view of the operator console 112 is illustrated. In the illustrated embodiment, the operator console 112 is a two-piece component having a first portion 202 and a second portion 204. In other embodiments, the operator console 112 may be a single or multipiece component, based on application requirements. Each of the first portion 202 and the second portion 204 is adapted to be coupled to one another. Also, each of the first portion 202 and the second portion 204 has a substantially hollow configuration. Accordingly, the operator console 112 is adapted to enclose one or more components (not shown), such as electrical/electronic circuitry components, wires, cables, mounting elements, and so on. The operator console 112 may be made of any material, such as a polymer, a metal, an alloy, and so on, or a combination thereof. The operator console 112 may be manufactured using any process, such as molding, casting, fabrication, additive manufacturing, and so on.

The operator console 112 includes an operator interface 206. The operator interface 206 is disposed on the first portion 202 of the operator console 112. The operator interface 206 is adapted to house the one or more controls, such as a start-stop switch 208, a steering wheel 116 (shown in FIG. 1), a display unit 302 (shown in FIG. 3A), one or more switches 304 (shown in FIG. 3A), and the like. The controls are adapted to operate the machine 100 on the ground and control one or more functions of the machine 100. The operator console 112 also includes a storage compartment 210. The storage compartment 210 is disposed adjacent to the operator interface 206. In the illustrated embodiment, the storage compartment 210 is adapted to be removably mounted in the operator console 112. In other embodiments, the storage compartment 210 may be integrally manufactured with the operator console 112.

The storage compartment 210 has a substantially hollow configuration. Accordingly, the storage compartment 210 is adapted to receive one or more utilities or products, such as an operator manual, a first-aid kit, a tool-kit, and so on. The storage compartment 210 may be made of any material, such as a polymer, a metal, an alloy, and so on, or a combination thereof. The storage compartment 210 may be manufactured using any process, such as molding, casting, fabrication, additive manufacturing, and so on.

The operator console 112 also includes a lid 212. The lid 212 is provided in association with the storage compartment 210. In the illustrated embodiment, the lid 212 has a substantially curved configuration. In other embodiments, the lid 212 may have any other configuration, such as a planar configuration, and so on. The lid 212 also includes a number of rail members, such as a first rail member 214 and a second rail member 216. Each of the first rail member 214 and the second rail member 216 is disposed adjacent and parallel to one another. Also, each of the first rail member 214 and the second rail member 216 is disposed on an inner surface 218 of the lid 212. The lid 212 may be made of any material, such as a polymer, a metal, an alloy, and so on, or a combination thereof. The lid 212 may be manufactured using any process, such as molding, casting, fabrication, additive manufacturing, and so on.

The lid 212 is movably coupled to the operator console 112 via a number of hinge members, such as a first hinge member 220 and a second hinge member 222. In the illustrated embodiment, each of the first hinge member 220 and the second hinge member 222 has a curved configuration. In other embodiments, each of the first hinge member 220 and the second hinge member 222 may have any other configuration, such as an angled configuration, and so on. Each of the first hinge member 220 and the second hinge member 222 may be made of any material, such as a polymer, a metal, an alloy, and so on, or a combination thereof. Each of the first hinge member 220 and the second hinge member 222 may be manufactured using any process, such as molding, casting, fabrication, additive manufacturing, and so on. The lid 212 also includes a locking element 224. In the illustrated embodiment, the locking element 224 is a handle/latch type locking element. In other embodiments, the locking element 224 may be any locking element, such as a cylinder type locking element. The locking element 224 is adapted hold the lid 212 and removably lock the lid 212 in an operating position and will be explained in more detail later.

The operator console 112 further includes a cover 226. The cover 226 is provided in association with each of the operator interface 206 and the storage compartment 210. Accordingly, the cover 226 is adapted to enclose the operator interface 206 and/or the storage compartment 210 based on an operating position of the cover 226. In the illustrated embodiment, the cover 226 is a two-piece component having a first section 228 and second section 230. Each of the first section 228 and the second section 230 of the cover 226 is adapted to be rotatably coupled to the operator console 112 about hinge joints 232, 234 provided on the operator console 112.

The first section 228 has a substantially curved and hollow configuration. In other embodiments, the first section 228 may have any other configuration, such as a rectangular configuration, and so on, based on application requirements. The first section 228 includes a first side 236 and a second side 238. The second side 238 is disposed opposite to the first side 236. The first section 228 includes first hinge points 240, 242 disposed on each of the first side 236 and the second side 238, respectively. The first hinge points 240, 242 define a first rotational axis F-F' of the first section 228. Each of the first hinge points 240, 242 is adapted to be rotatably coupled to the operator console 112 about each of the hinge joints 232, 234, respectively. Accordingly, in an assembled position, the first section 228 is adapted to selectively rotate between a first position "P1" and a second position "P2" about the first rotational axis F-F' and will be explained in more detail later.

The first section 228 also includes a first lip portion 244. The first lip portion 244 is disposed along a first edge 246 of the first section 228 and on an inner surface 248 of the first section 228. More specifically, the first lip portion 244 extends along the first edge 246 substantially between the first side 236 and the second side 238 of the first section 228. Also, the first lip portion 244 extends away from the first edge 246 of the first section 228 toward the first rotational axis F-F'. The first lip portion 244 is adapted to engage with the second section 230 in an operating position of the first section 228 and will be explained in more detail later. It should be noted that a location and/or configuration of the first lip portion 244 described herein is merely exemplary and may vary. For example, in other embodiments, the first lip portion 244 may be disposed at any other location on the inner surface 248 of the first section 228 and/or may have a discontinuous length, based on application requirements.

The first section 228 also includes a first recess 250. In the illustrated embodiment, the first recess 250 is disposed on the first side 236 of the first section 228. In other embodiments, the first recess 250 may be disposed on any other location on the first section 228, such as the second side 238 of the first section 228, based on application requirements. The first recess 250 will be explained in more detail later. The first section 228 further includes a first protrusion 252. The first protrusion 252 is disposed along a second edge 278 of the first section 228 and on the inner surface 248 of the first section 228. More specifically, the first protrusion 252 extends along the second edge 278 substantially between the first side 236 and the second side 238 of the first section 228. Also, the first protrusion 252 extends away from the inner surface 248 of the first section 228. The first protrusion 252 is adapted to engage with the operator console 112 in an operating position of the first section 228 and will be explained in more detail later.

The second section 230 has a substantially curved and hollow configuration. In other embodiments, the second section 230 may have any other configuration, such as a rectangular configuration, and so on, based on application requirements. The second section 230 includes a first side 254 and a second side 256. The second side 256 is disposed opposite to the first side 254. The second section 230 includes second hinge points 258, 260 disposed on each of the first side 254 and the second side 256, respectively. The second hinge points 258, 260 define a second rotational axis S-S' of the second section 230. Each of the second hinge points 258, 260 is adapted to be rotatably coupled to the operator console 112 about each of the hinge joints 232, 234 respectively. Accordingly, in an assembled position, the second section 230 is adapted to selectively rotate between a third position "P3", a fourth position "P4", and a fifth position "P5" about the second rotational axis S-S' and will be explained in more detail later.

The second section 230 also includes a second lip portion 262. The second lip portion 262 is disposed along a first edge 264 of the second section 230 and on an outer surface 266 of the second section 230. More specifically, the second lip portion 262 extends along the first edge 264 substantially between the first side 254 and the second side 256 of the second section 230. Also, the second lip portion 262 extends away from the first edge 264 of the second section 230 and the second rotational axis S-S'. The second lip portion 262 is adapted to engage with the first lip portion 244 of the first section 228 in an operating position of the second section 230 and will be explained in more detail later. It should be noted that a location and/or configuration of the second lip portion 262 described herein is merely exemplary and may vary. For example, in other embodiments, the second lip portion 262 may be disposed at any other location on the outer surface 266 of the second section 230 and/or may have a discontinuous length, based on application requirements.

The second section 230 also includes a third lip portion 268. The third lip portion 268 is disposed along a second edge 270 of the second section 230 and on the outer surface 266 of the second section 230. More specifically, the third lip portion 268 extends along the second edge 270 substantially between the first side 254 and the second side 256 of the second section 230. Also, the third lip portion 268 extends away from the second edge 270 of the second section 230 and the second rotational axis S-S'. The third lip portion 268 is adapted to engage with the first edge 246 of the first section 228 in an operating position of the second section 230 and will be explained in more detail later. It should be noted that a location and/or configuration of the third lip portion 268 described herein is merely exemplary and may vary. For example, in other embodiments, the third lip portion 268 may be disposed at any other location on the outer surface 266 of the second section 230 and/or may have a continuous length, based on application requirements.

The second section 230 also includes a second recess 272. In the illustrated embodiment, the second recess 272 is disposed on the first side 254 of the second section 230. The second recess 272 is adapted to enclose the start-stop switch 208 in an operating position of the second section 230. In other embodiments, the second recess 272 may be disposed on any other location on the second section 230, such as the second side 256 of the second section 230, based on application requirements. The second section 230 also includes a third recess 274. In the illustrated embodiment, the third recess 274 is disposed on the second edge 270 of the second section 230. Also, the third recess 274 extends toward the first edge 264 of the second section 230. The third recess 274 is adapted to receive a steering column 118 (shown in FIG. 1) of the machine 100 in an operating position of the second section 230 and will be explained in more detail later. In other embodiments, the third recess 274 may be provided on any other location of the second section 230, based on application requirements.

Referring to FIGS. 3A to 3F, different assembled views of the operator console 112 are illustrated. In the assembled position, each of the first rotational axis F-F' of the first section 228 and the second rotational axis S-S' of the second section 230 of the cover 226 coincide at each of the hinge joints 232, 234 of the operator console 112. Different operating positions of each of the first section 228 and the second section 230 of the cover 226 will now be explained with combined reference to FIGS. 3A to 3F.

Figure 3A:
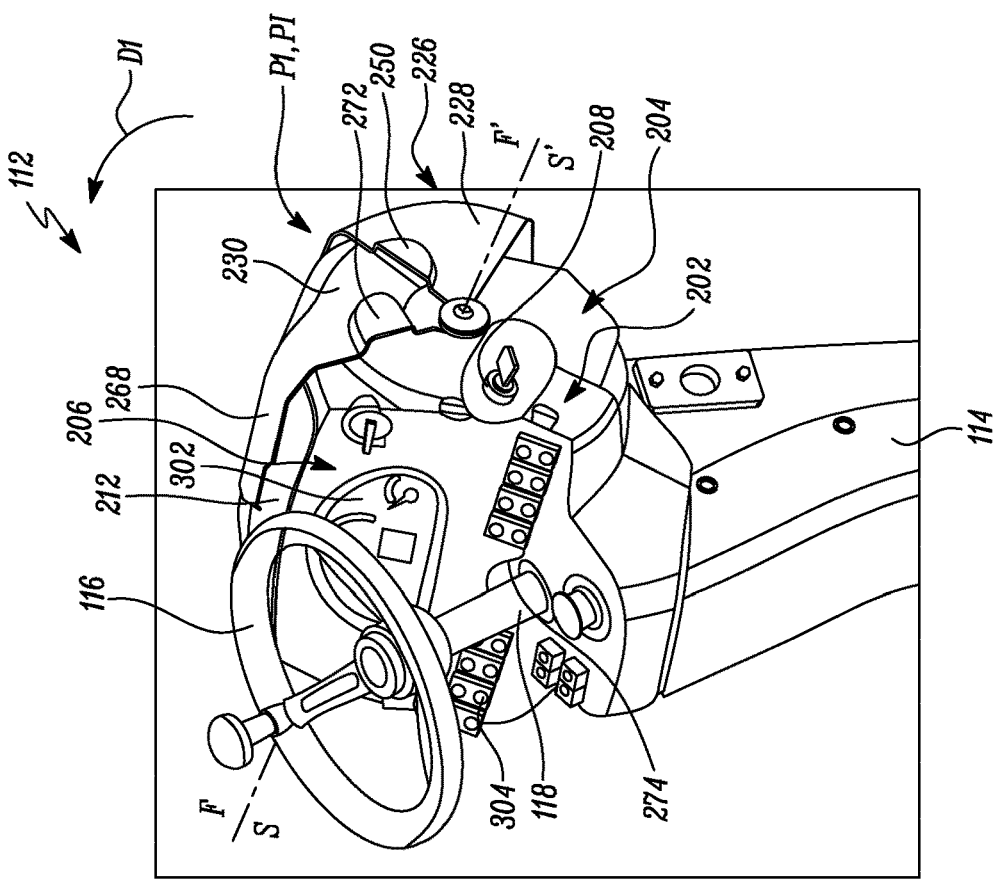

Referring to FIG. 3A, the first section 228 is shown in the first position "P1" and the second section 230 is shown in the third position "P3". Each of the first position "P1" and the third position "P3" refers to an open position of the first section 228 and the second section 230, respectively. Accordingly, in the first position "P1", the first section 228 is adapted to provide access to each of the storage compartment 210 and the operator interface 206. In the third position "P3", the second section 230 is adapted to provide access to each of the storage compartment 210 and the operator interface 206. Also, in the third position "P3", the second section 230 is partially disposed within the first section 228 disposed in the first position "P1". Also, in the third position "P3", the second recess 272 of the second section 230 is partially received within the first recess 250 of the first section 228 disposed in the first position "P1".

Figure 3B:
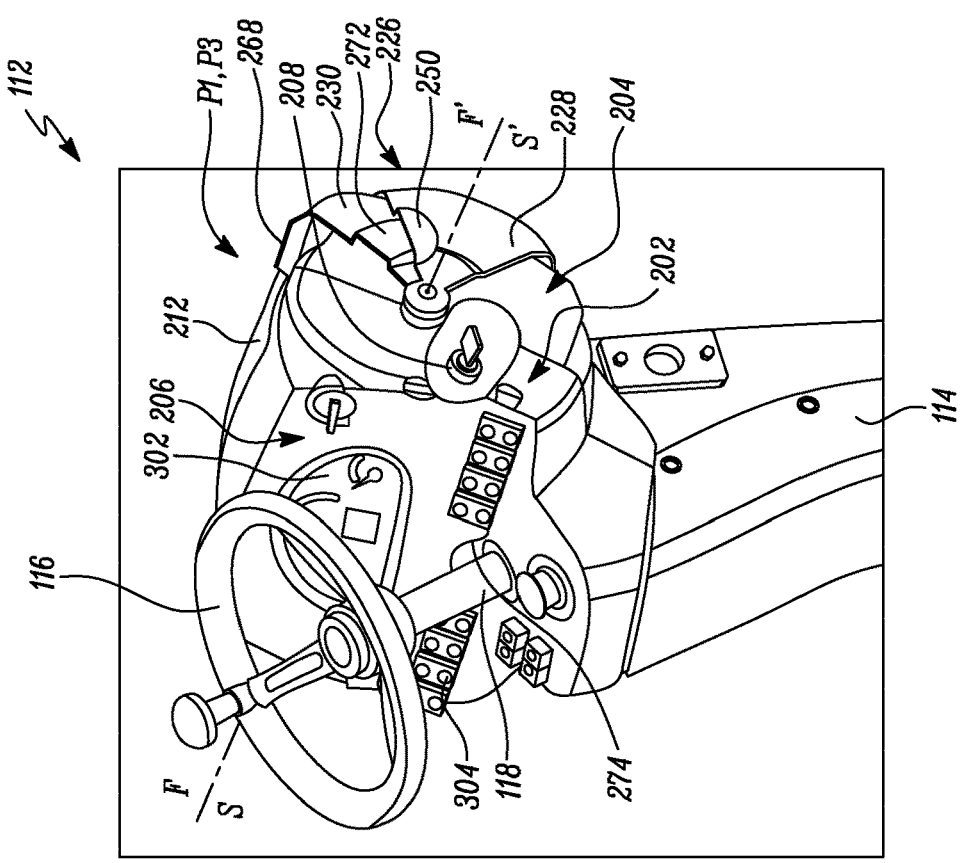

Referring to FIG. 3B, the second section 230 of the cover 226 is rotated about the second rotational axis S-S' in a direction "D1". As shown in the accompanying figure, the second section 230 of the cover 226 is disposed in an intermediate position "PI" and the first section 228 of the cover 226 is disposed in the first position "P1". In the intermediate position "PI", the second section 230 provides partial access to the storage compartment 210. Further, in the intermediate position "PI" of the second section 230, the first lip portion 244 of the first section 228 engages with the second lip portion 262 of the second section 230.

Figures 3C, 3D:
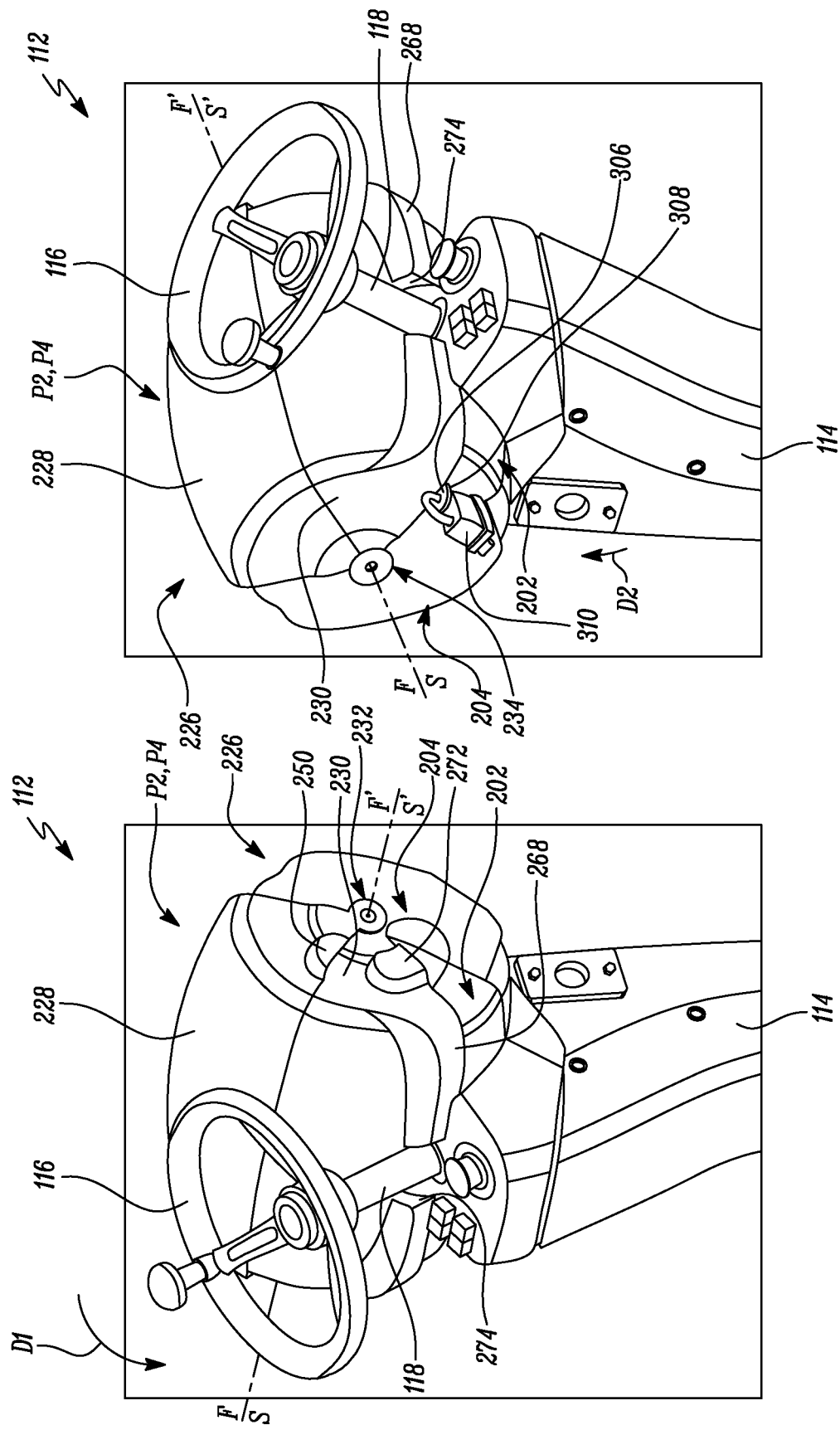

Referring to FIG. 3C, as the second section 230 is further rotated about the second rotational axis S-S' in the direction "D1", the engagement of each of the first lip portion 244 of the first section 228 and the second lip portion 262 of the second section 230 provides rotation of the first section 228 along the first rotational axis F-F' in the direction "D1". As such, the second section 230 is adapted to engage with the first section 228 during rotation of the second section 230 from the third position "P3" to the fourth position "P4" to rotate the first section 228 from the first position "P1" to the second position "P2".

As shown in the accompanying figure, the first section 228 is disposed in the second position "P2" and the second section 230 is disposed in the fourth position "P4". Each of the second position "P2" and the fourth position "P4" refers to a closed position of the first section 228 and the second section 230, respectively. More specifically, in the second position "P2", the first section 228 partially encloses each of the storage compartment 210, such as the locking element 224 of the lid 212, and the operator interface 206. Also, in the fourth position "P4", the second section 230 encloses the operator interface 206 in association with the first section 228 disposed in the second position "P2". In the fourth position "P4", the second recess 272 of the second section 230 encloses the start-stop switch 208 provided on the operator console 112. Also, in the fourth position "P4", the third recess 274 of the second section 230 receives the steering column 118 of the machine 100.

Referring to FIG. 3D, another perspective view of the operator console 112 of FIG. 3C is illustrated. The second section 230 further includes a first tab 306. In the illustrated embodiment, the first tab 306 is disposed on the second side 256 of the second section 230. In other embodiments, the first tab 306 may be disposed on any other location on the second section 230, such as the first side 254 of the second section 230, based on application requirements. Also, the operator console 112 includes a second tab 308 provided on the first portion 202 of the operator console 112. As shown in the accompanying figure, in the fourth position "P4" of the second section 230, the first tab 306 of the second section 230 of the cover 226 aligns with the second tab 308 provided on the operator console 112. As such, a locking member 310, such as a padlock, a ring lock, and so on, may be coupled to each of the first tab 306 and the second tab 308 in order to removably lock the second section 230 of the cover 226 in the fourth position "P4" and the first section 228 of the cover 226 in the second position "P2".

Referring to FIG. 3E, a partial bottom perspective view of the operator console 112 of FIG. 3D along a direction "D2" (shown in FIG. 3D) is illustrated. In the second position "P2" of the first section 228, the first protrusion 252 of the first section 228 of the cover 226 engages with a second protrusion 276 (also shown in FIG. 2) provided on the second portion 204 of the operator console 112. As such, the engagement between the first protrusion 252 and the second protrusion 276 limits rotational movement of the first section 228 of the cover 226 in the direction "D1" beyond the second position "P2". Accordingly, rotation of the first section 228 in the direction "D1" and falling of the first section 228 over the second section 230 in the closed position of the cover 226 is limited.

Referring to FIG. 3F, in order to rotate the cover 226 in the open position, the second section 230 of the cover 226 is rotated about the second rotational axis S-S' in a direction "D3" in to the fifth position "P5". The fifth position "P5" is disposed between the third position "P3" and the fourth position "P4". As shown in the accompanying figures, in the fifth position "P5", the second section 230 of the cover 226 provides partial access to the operator interface 206, for example, access to a number of switches 304, the start-stop switch 208, and so on. Also, in the fifth position "P5", the second section 230 is disposed partially within the first section 228 disposed in the second position "P2". Further, in the fifth position "P5", the third lip portion 268 of the second section 230 engages with the first edge 246 of the first section 228 of the cover 226. As the second section 230 of the cover 226 is further rotated about the second rotational axis S-S' in the direction "D3", the engagement of each of the third lip portion 268 of the second section 230 and the first edge 246 of the first section 228 provides rotation of the first section 228 along the first rotational axis F-F' in the direction "D3". As such, the second section 230 is adapted to engage with the first section 228 during rotation of the second section 230 from the fourth position "P4" to the third position "P3" to rotate the first section 228 from the second position "P2" to the first position "P1".

Figures 4A, 4B:
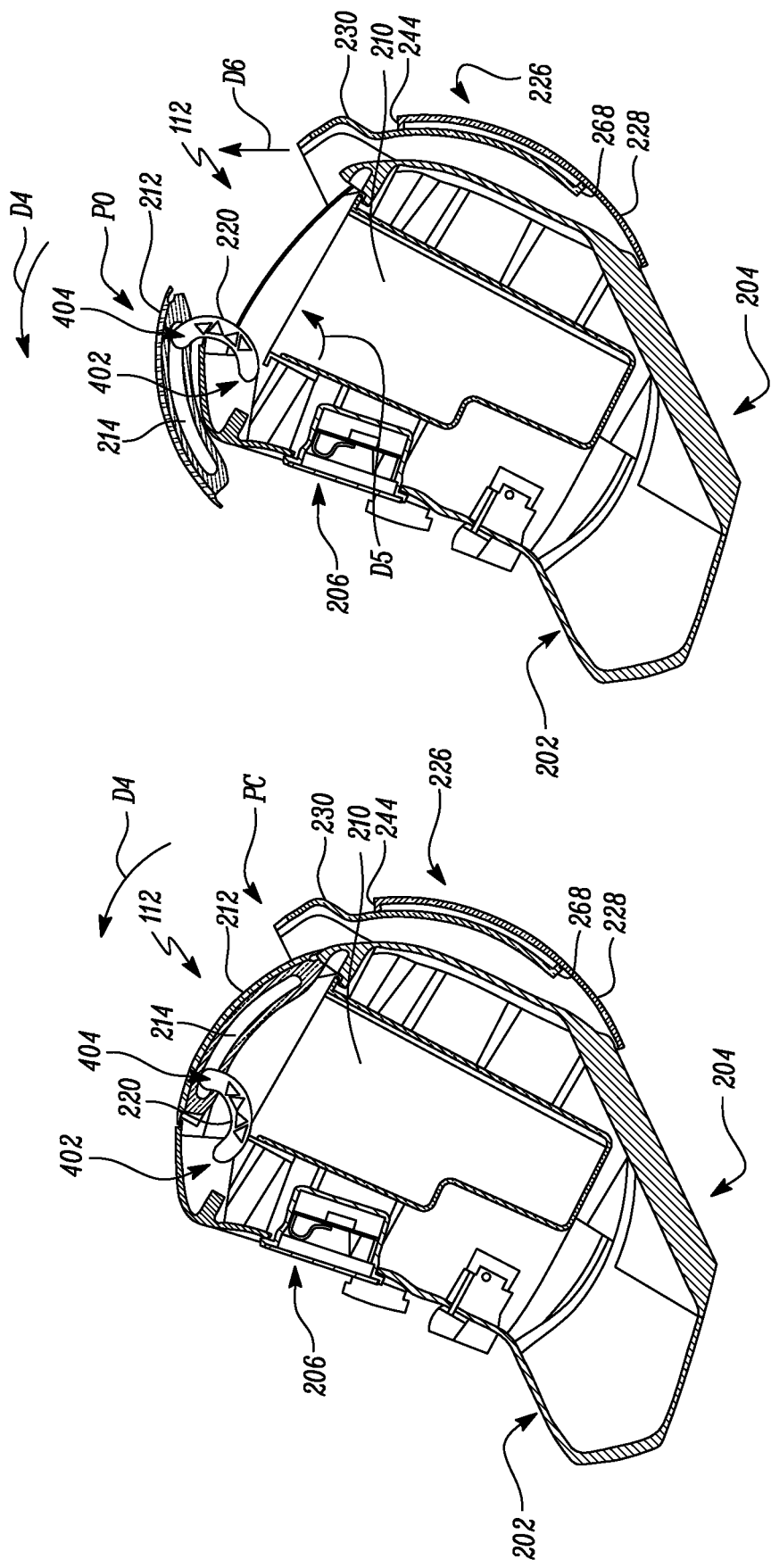
FIGS. 4A and 4B are different cross-sectional views of the operator console of FIG. 3A, according to one embodiment of the present disclosure.

Referring to FIGS. 4A and 4B, different cross-sectional views of the operator console 112 in the assembled position are illustrated. In the accompanying figures, the first section 228 and the second section 230 of the cover 226 is disposed in the first position "P1" and the third position "P3", respectively. Referring to FIG. 4A, the first hinge member 220 includes a first end 402 and a second end 404. The first hinge member 220 is rotatably coupled to the operator console 112 via the first end 402. Also, the first hinge member 220 is slidably coupled to the first rail member 214 of the lid 212. It should be noted that the second hinge member 222 may be coupled to the operator console 112 and the second rail member 216 of the lid 212 in a manner similar to a manner described with reference to the first hinge member 220 and the first rail member 214. As shown, in the accompanying figure, the lid 212 is disposed in a closed position "PC". In the closed position "PC", the lid 212 encloses the storage compartment 210 and limits access into the storage compartment 210. Additionally, the locking element 224 may provide locking of the lid 212 in the closed position "PC" with respect to the operator console 112.

Referring to FIG. 4B, as the lid 212 is moved in a direction "D4", the first hinge member 220 rotates about the first end 402 in a direction "D5" with respect to the operator console 112. As such, the lid 212 is lifted in a direction "D6" from the closed position "PC" with respect to the operator console 112. Further, the first rail member 214 slides with respect to the second end 404 of the first hinge member 220 in order to slidably move the lid 212 in the direction "D4" from the closed position "PC" to an open position "PO". As such, the first hinge member 220 provides slidable movement of the lid 212 between the closed position "PC" and the open position "PO" and vice versa in the first position "P1" of the first section 228 and the third position "P3" of the second section 230. It should be noted that a configuration, interaction, and operation of the second hinge member 222 and the second rail member 216 of the lid 212 is similar to a configuration, interaction, and operation of the first hinge member 220 and the first rail member 214 of the lid 212 as described herein.

INDUSTRIAL APPLICABILITY

The present disclosure relates to the cover 226 for the operator console 112 of the machine 100. The cover 226 includes the first section 228 and the second section 230 rotatably coupled to the operator console 112 at the hinge joints 232, 234. As such, the first section 228 rotates between the first position "P1" and the second position "P2" about the hinge joints 232, 234. Also, the second section 230 rotates between the third position "P3", the fourth position "P4", the fifth position "P5", and the intermediate position "PI" about the hinge joints 232, 234. In the first position "P1" of the first section 228 and the third position "P3" of the second section 230, the cover 226 is disposed in the open position and provides access to each of the operator interface 206 and the lid 212 of the storage compartment 210.

Also, in the open position of the cover 226, the second section 230 is partially disposed within the first section 228, in turn, limiting an overall footprint of the cover 226 and utilization of space around the operator console 112. Additionally, in the open position of the cover 226, the first recess 250 of the first section 228 of the cover 226 receives the second recess 272 of the second section 230 of the cover 226, in turn, providing entry of the second section 230 within the first section 228 and limiting the overall footprint of the cover 226 and utilization of space around the operator console 112.

In the second position "P2" of the first section 228 and the fourth position "P4" of the second section 230, the cover 226 is disposed in the closed position and encloses the operator interface 206 and partially encloses the lid 212 of the storage compartment 210. As such, in the closed position, the cover 226 provides protection to the operator interface 206 against environmental conditions, physical impacts, dust and/or debris accumulation, water and/or snow ingress, and so on. Also, in the closed position of the cover 226, the second recess 272 of the second section 230 of the cover 226 encloses the start-stop switch 208, in turn, limiting unauthorized operation of the machine 100.

Additionally, in the closed position of the cover 226, the locking member 310 may be coupled to each of the first tab 306 of the second section 230 of the cover 226 and the second tab 308 of the operator console 112, in turn, limiting unauthorized access to the operator interface 206 and/or accidental opening of the cover 226. In the closed position of the cover 226, the third recess 274 of the second section 230 of the cover 226 receives the steering column 118 of the machine 100, in turn, limiting interference of the cover 226 with the steering column 118. Further, in the closed position of the cover 226, the first protrusion 252 of the first section 228 of the cover 226 engages with the second protrusion 276 of the operator console 112, in turn, limiting rotational movement of the first section 228 beyond the second position "P2" and over the second section 230 disposed in the fourth position "P4".

In the intermediate position "PI" of the second section 230 of the cover 226, the first lip portion 244 of the first section 228 engages with the second lip portion 262 of the second section 230. Accordingly, each of the first lip portion 244 and the second lip portion 262 provides rotation of the first section 228 from the first position "P1" to the second position "P2" by rotation of the second section 230 from the intermediate position "PI" to the fourth position "P4". As such, each of the first lip portion 244 and the second lip portion 262 provides one-handed and one-part operation of the cover 226 by operating only the second section 230 of the cover 226.

In the fifth position "P5" of the second section 230 of the cover 226, the first edge 246 of the first section 228 engages with the third lip portion 268 of the second section 230. Accordingly, each of the first edge 246 and the third lip portion 268 provides rotation of the first section 228 from the second position "P2" to the first position "P1" by rotation of the second section 230 from the fifth position "P5" to the third position "P3". As such, each of the first edge 246 and the third lip portion 268 provides one-handed and one-part operation of the cover 226 by operating only the second section 230 of the cover 226. Further, the first section 228 and the second section 230 is held in the first position "P1"

and the third position "P3", respectively, by self-weight and gravity, in turn, limiting use of additional retention means, system cost, and complexity.

The operator console 112 also includes the lid 212 for the storage compartment 210. The lid 212 is movably coupled to the operator console 112 using each of the first hinge member 220 and the second hinge member 222. Each of the first hinge member 220 and the second hinge member 222 includes a low-profile configuration, in turn, providing a substantially sliding movement of the lid 212 between the open position "PO" and the closed position "PC". As such, each of the first hinge member 220 and the second hinge member 222 limits interference of the lid 212 during movement of the lid 212 between the open position "PO" and the closed position "PC" with surrounding objects, such as the steering wheel 116. The lid 212 also includes the locking element 224. As such, the locking element 224 provides locking of the lid 212 in the closed position "PC", in turn, limiting unauthorized access to the storage compartment 210 and/or accidental opening of the lid 212.

The cover 226 provides a simple, effective, and cost-efficient method of providing protection to the operator interface 206 of the operator console 112. The cover 226 includes minimalistic design and limited components, in turn, reducing system cost and complexity. The cover 226 may be operated by hand without use of specialized tools, in turn, improving usability. Also, the cover 226 may be incorporated on any operator console with little or no modification to the existing system, in turn, improving flexibility and compatibility.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A cover for an operator console of a machine, the operator console having an operator interface and a storage compartment disposed adjacent to the operator interface, the cover comprising:
   a first section rotatably coupled to the operator console, the first section adapted to selectively rotate between a first position and a second position about a rotational axis, wherein the first section is adapted to provide access to each of the storage compartment and the operator interface in the first position and at least partially enclose each of the storage compartment and the operator interface in the second position; and
   a second section rotatably coupled to the operator console and the first section, the second section adapted to selectively rotate between a third position and a fourth position about the rotational axis, wherein the second section is adapted to provide access to each of the storage compartment and the operator interface in the third position and enclose the operator interface in the fourth position in association with the first section disposed in the second position,
      wherein the second section is adapted to engage with the first section during rotation of the second section from the third position to the fourth position to rotate the first section from the first position to the second position, and
      wherein the second section is adapted to engage with the first section during rotation of the second section from the fourth position to the third position to rotate the first section from the second position to the first position.

2. The cover of claim 1, wherein the second section is further adapted to rotate into a fifth position between the third position and the fourth position, the second section adapted to provide at least partial access to the operator interface in the fifth position.

3. The cover of claim 2, wherein the second section is at least partially disposed within the first section in each of the third position and the fifth position of the second section.

4. The cover of claim 1, wherein the second section is adapted to engage with the first section during rotation of the second section from the third position to the fourth position through a first lip portion disposed on the first section and a second lip portion disposed on the second section.

5. The cover of claim 1, wherein the second section is adapted to engage with the first section during rotation of the second section from the fourth position to the third position through a third lip portion disposed on the second section and an edge disposed on the first section.

6. The cover of claim 1, wherein the storage compartment further includes:
   a lid having at least one rail member; and
   at least one a hinge member rotatably coupled to the operator console and slidably coupled to the at least one rail member,
      wherein the lid is adapted to slidably move between an open position and a closed position in the first position of the first section and the third position of the second section.

7. The cover of claim 1, wherein the first section further includes a first protrusion, the first protrusion adapted to engage with a second protrusion provided on the operator console in the second position of the first section.

8. The cover of claim 1, wherein the second section further includes at least one recess, the at least one recess adapted to receive one of a start-stop switch and a steering column provided on the operator interface in the third position of the second section.

9. The cover of claim 1, wherein the second section further includes a first tab, the first tab adapted to align with a second tab provided on the operator console in the third position of the second section, each of the first tab and the second tab adapted to receive a locking member.

10. An operator console for a machine, the operator console comprising:
   an operator interface;
   a storage compartment disposed adjacent to the operator interface; and
   a cover provided in association with each of the operator interface and the storage compartment, the cover including:
      a first section rotatably coupled to the operator console, the first section adapted to selectively rotate between a first position and a second position about a rotational axis, wherein the first section is adapted to provide access to each of the storage compartment and the operator interface in the first position and at least partially enclose each of the storage compartment and the operator interface in the second position; and
      a second section rotatably coupled to the operator console and the first section, the second section adapted to selectively rotate between a third position and a fourth position about the rotational axis, wherein the second section is adapted to provide access to each of the storage compartment and the operator interface in the third position and enclose the operator interface in the fourth position in association with the first section disposed in the second position,
wherein the second section is adapted to engage with the first section during rotation of the second section from the third position to the fourth position to rotate the first section from the first position to the second position, and
wherein the second section is adapted to engage with the first section during rotation of the second section from the fourth position to the third position to rotate the first section from the second position to the first position.

11. The operator console of claim 10, wherein the second section is further adapted to rotate into a fifth position between the third position and the fourth position, the second section adapted to provide at least partial access to the operator interface in the fifth position.

12. The operator console of claim 11, wherein the second section is at least partially disposed within the first section in each of the third position and the fifth position of the second section.

13. The operator console of claim 10, wherein the second section is adapted to engage with the first section during rotation of the second section from the third position to the fourth position through a first lip portion disposed on the first section and a second lip portion disposed on the second section.

14. The operator console of claim 10, wherein the second section is adapted to engage with the first section during rotation of the second section from the fourth position to the third position through a third lip portion disposed on the second section and an edge disposed on the first section.

15. The operator console of claim 10, wherein the storage compartment further includes:
a lid having at least one rail member; and
at least one a hinge member rotatably coupled to the operator console and slidably coupled to the at least one rail member,
wherein the lid is adapted to slidably move between an open position and a closed position in the first position of the first section and the third position of the second section.

16. A machine comprising:
a frame;
a power source provided on the frame;
a plurality of ground engaging members rotatably coupled to the frame; and
an operator console provided on the frame, the operator console including:
an operator interface;
a storage compartment disposed adjacent to the operator interface; and
a cover provided in association with each of the operator interface and the storage compartment, the cover including:
a first section rotatably coupled to the operator console, the first section adapted to selectively rotate between a first position and a second position about a rotational axis, wherein the first section is adapted to provide access to each of the storage compartment and the operator interface in the first position and at least partially enclose each of the storage compartment and the operator interface in the second position; and
a second section rotatably coupled to the operator console and the first section, the second section adapted to selectively rotate between a third position and a fourth position about the rotational axis, wherein the second section is adapted to provide access to each of the storage compartment and the operator interface in the third position and enclose the operator interface in the fourth position in association with the first section disposed in the second position,
wherein the second section is adapted to engage with the first section during rotation of the second section from the third position to the fourth position to rotate the first section from the first position to the second position, and
wherein the second section is adapted to engage with the first section during rotation of the second section from the fourth position to the third position to rotate the first section from the second position to the first position.

17. The machine of claim 16, wherein the second section is further adapted to rotate into a fifth position between the third position and the fourth position, the second section adapted to provide at least partial access to the operator interface in the fifth position.

18. The machine of claim 16, wherein the second section is adapted to engage with the first section during rotation of the second section from the third position to the fourth position through a first lip portion disposed on the first section and a second lip portion disposed on the second section.

19. The machine of claim 16, wherein the second section is adapted to engage with the first section during rotation of the second section from the fourth position to the third position through a third lip portion disposed on the second section and an edge disposed on the first section.

20. The machine of claim 16, wherein the storage compartment further includes:
a lid having at least one rail member; and
at least one a hinge member rotatably coupled to the operator console and slidably coupled to the at least one rail member,
wherein the lid is adapted to slidably move between an open position and a closed position in the first position of the first section and the third position of the second section.

* * * * *